(12) United States Patent
Sobel et al.

(10) Patent No.: US 8,667,592 B2
(45) Date of Patent: Mar. 4, 2014

(54) SYSTEMS AND METHODS FOR LOOKING UP ANTI-MALWARE METADATA

(75) Inventors: William E. Sobel, Jamul, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 162 days.

(21) Appl. No.: 13/048,380

(22) Filed: Mar. 15, 2011

(65) Prior Publication Data

US 2012/0240229 A1  Sep. 20, 2012

(51) Int. Cl.
*G06F 11/00* (2006.01)
(52) U.S. Cl.
USPC .................................. 726/24; 726/22; 726/23
(58) Field of Classification Search
None
See application file for complete search history.

(56) References Cited

U.S. PATENT DOCUMENTS

| | | | | |
|---|---|---|---|---|
| 6,071,317 | A * | 6/2000 | Nagel | 717/128 |
| 6,230,288 | B1 | 5/2001 | Kuo et al. | |
| 7,620,633 | B1 * | 11/2009 | Parsons et al. | 1/1 |
| 7,844,700 | B2 * | 11/2010 | Marinescu et al. | 709/224 |
| 8,141,153 | B1 * | 3/2012 | Gardner et al. | 726/22 |
| 8,510,827 | B1 * | 8/2013 | Leake et al. | 726/22 |
| 2006/0107264 | A1 * | 5/2006 | Schmidt et al. | 718/100 |
| 2006/0130141 | A1 * | 6/2006 | Kramer et al. | 726/23 |
| 2006/0143713 | A1 | 6/2006 | Challener et al. | |
| 2007/0079377 | A1 * | 4/2007 | Pagan | 726/24 |
| 2007/0118906 | A1 * | 5/2007 | Mustafa et al. | 726/23 |
| 2007/0300298 | A1 * | 12/2007 | Goranson et al. | 726/22 |
| 2009/0282240 | A1 * | 11/2009 | Zhou et al. | 713/156 |
| 2009/0287653 | A1 * | 11/2009 | Bennett | 707/3 |
| 2009/0288097 | A1 * | 11/2009 | Chen et al. | 718/107 |
| 2009/0293126 | A1 * | 11/2009 | Archer et al. | 726/24 |
| 2010/0199350 | A1 * | 8/2010 | Lilibridge et al. | 726/24 |
| 2011/0119481 | A1 * | 5/2011 | Auradkar et al. | 713/150 |
| 2012/0005663 | A1 * | 1/2012 | Burckart et al. | 717/166 |
| 2012/0079596 | A1 * | 3/2012 | Thomas et al. | 726/24 |
| 2012/0095958 | A1 * | 4/2012 | Pereira et al. | 707/609 |
| 2012/0260340 | A1 * | 10/2012 | Morris et al. | 726/23 |

OTHER PUBLICATIONS

Zhang PT, Wang W, Tan Y. "A malware detection model based on a negative selection algorithm with penalty factor" Sci China Inf Sci. 2010, 53: 2461-2471, doi: 10:1007/s11432-010-4123-5.*
International Search Report and Written Opinion of the International Searching Authority from related International Application No. PCT/US2012/029101; Jul. 13, 2012.

* cited by examiner

*Primary Examiner* — Jeffrey Pwu
*Assistant Examiner* — Carlos Amorin
(74) *Attorney, Agent, or Firm* — ALG Intellectual Property, LLC

(57) ABSTRACT

A computer-implemented method for looking up anti-malware metadata may include identifying a plurality of executable objects to be scanned for malware before execution. The computer-implemented method may also include, for each executable object within the plurality of executable objects, assessing an imminence of execution of the executable object. The computer-implemented method may further include prioritizing, based on the assessments, a retrieval order for anti-malware metadata corresponding to the plurality of executable objects. The computer-implemented method may additionally include retrieving anti-malware metadata corresponding to an executable object within the plurality of executable objects based on the retrieval order. Various other methods, systems, and computer-readable media are also disclosed.

20 Claims, 7 Drawing Sheets

SYSTEMS AND METHODS FOR LOOKING UP ANTI-MALWARE METADATA

BACKGROUND

Antivirus and antispyware solutions generally employ traditional scan-based technologies to identify viruses, worms, Trojan horses, spyware, and other malware on an endpoint device. Typical antivirus and antispyware solutions may detect these threats by checking files for characteristics (e.g., anti-malware signatures) of known threats. Once it detects the threat, the solution may remediate it, typically by deleting or quarantining it.

As the number of malware threats increase, the sizes of signature databases that identify these threats also increase. However, large anti-malware signature databases may be undesirable on a client device due to an increased disk footprint. Server-side lookups may alleviate problems related to storing anti-malware signatures locally but may delay access to applications while waiting for an anti-malware signature before allowing an application to launch. Accordingly, the instant disclosure identifies a need for additional and improved systems and methods for looking up anti-malware signatures.

SUMMARY

As will be described in greater detail below, the instant disclosure generally relates to systems and methods for looking up anti-malware metadata. Systems and methods described herein may predict when anti-malware metadata will be needed and prioritize the lookup of anti-malware metadata based on such predictions. For example, a method may include identifying a plurality of executable objects to be scanned for malware before execution. The method may also include, for each executable object within the plurality of executable objects, assessing an imminence of execution of the executable object. The method may additionally include prioritizing, based on the assessments, a retrieval order for anti-malware metadata corresponding to the plurality of executable objects and retrieving anti-malware metadata corresponding to an executable object within the plurality of executable objects based on the retrieval order.

The systems described herein may identify the plurality of executable objects from any of a variety of sources. For example, these systems may use system configuration information to identify a set of automatically launched executable objects. The system configuration information may indicate when each automatically launched executable object in the set of automatically launched executable objects is likely to launch. In this example, identifying the set of automatically launched executable objects may include identifying at least one executable object configured to launch during an operating system boot process. Additionally or alternatively, identifying the set of automatically launched executable objects may include identifying a service, a driver, an executable object configured to execute upon login, and/or an executable object configured to execute according to a task scheduler.

In some examples, identifying the plurality of executable objects may include identifying a set of executable objects likely to be launched by a user. For example, the set of executable objects may include an executable object on a desktop belonging to a user and/or an executable object in a download folder belonging to the user.

The systems described herein also may identify the plurality of executable objects by identifying a first executable object within the plurality of executable objects, identifying dependency information that indicates that the first executable object depends upon a second executable object, and then including the second executable object in the plurality of executable objects. Additionally or alternatively, identifying the plurality of executable objects may include identifying a first executable object within the plurality of executable objects and identifying a second executable object that operates as an extension to the first executable object. In some examples, identifying the plurality of executable objects may include identifying an executable object launched for execution and/or an executable object in execution.

Assessing the imminence of execution of the executable object may include examining the context in which the executable object was identified. In some examples, assessing the imminence of execution of the executable object may also include identifying a creation time of the executable object and increasing an expectation of imminent execution of the executable object monotonically with a distance between the creation time and the present time.

Prioritizing the retrieval order may include receiving, from a remote computing system, prioritization information for retrieving anti-malware metadata relating to at least one executable object within the plurality of executable objects. In some examples, the systems described herein may retrieve the anti-malware metadata in time to scan the executable object before an attempted launch of the executable object. In various examples, the systems described herein may retrieve an anti-malware signature from a remote storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
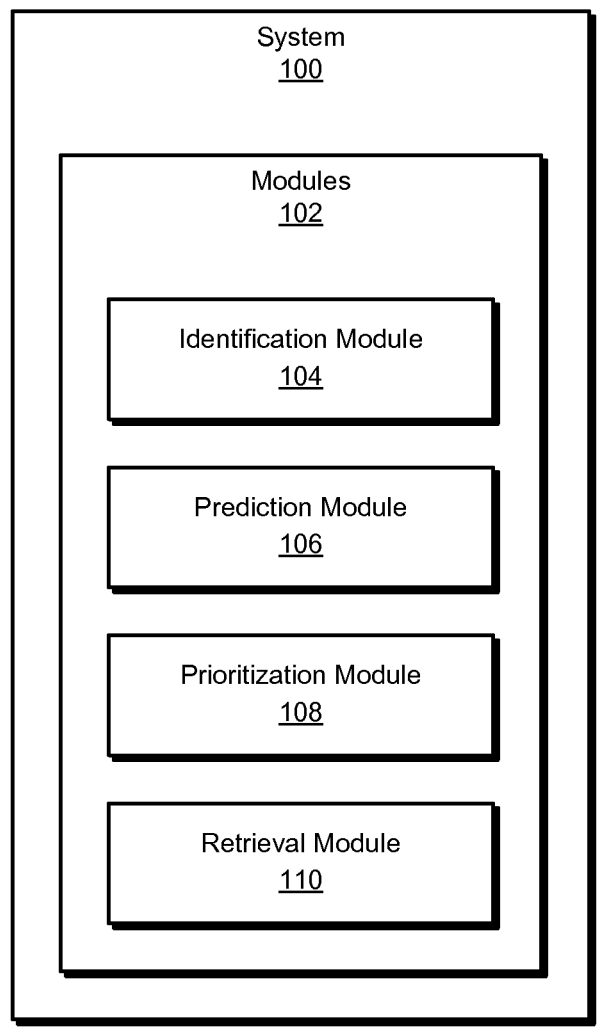
FIG. 1 is a block diagram of an exemplary system for looking up anti-malware metadata.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for looking up anti-malware metadata. Systems and methods described herein may predict when anti-malware metadata will be needed and prioritize the lookup of anti-malware metadata based on such predictions. By prioritizing the lookup of anti-malware metadata, these systems and methods may allow anti-malware systems to retrieve anti-malware metadata and scan executable files before launch with decreased perceived latency by users launching the executable files.

Figure 2:
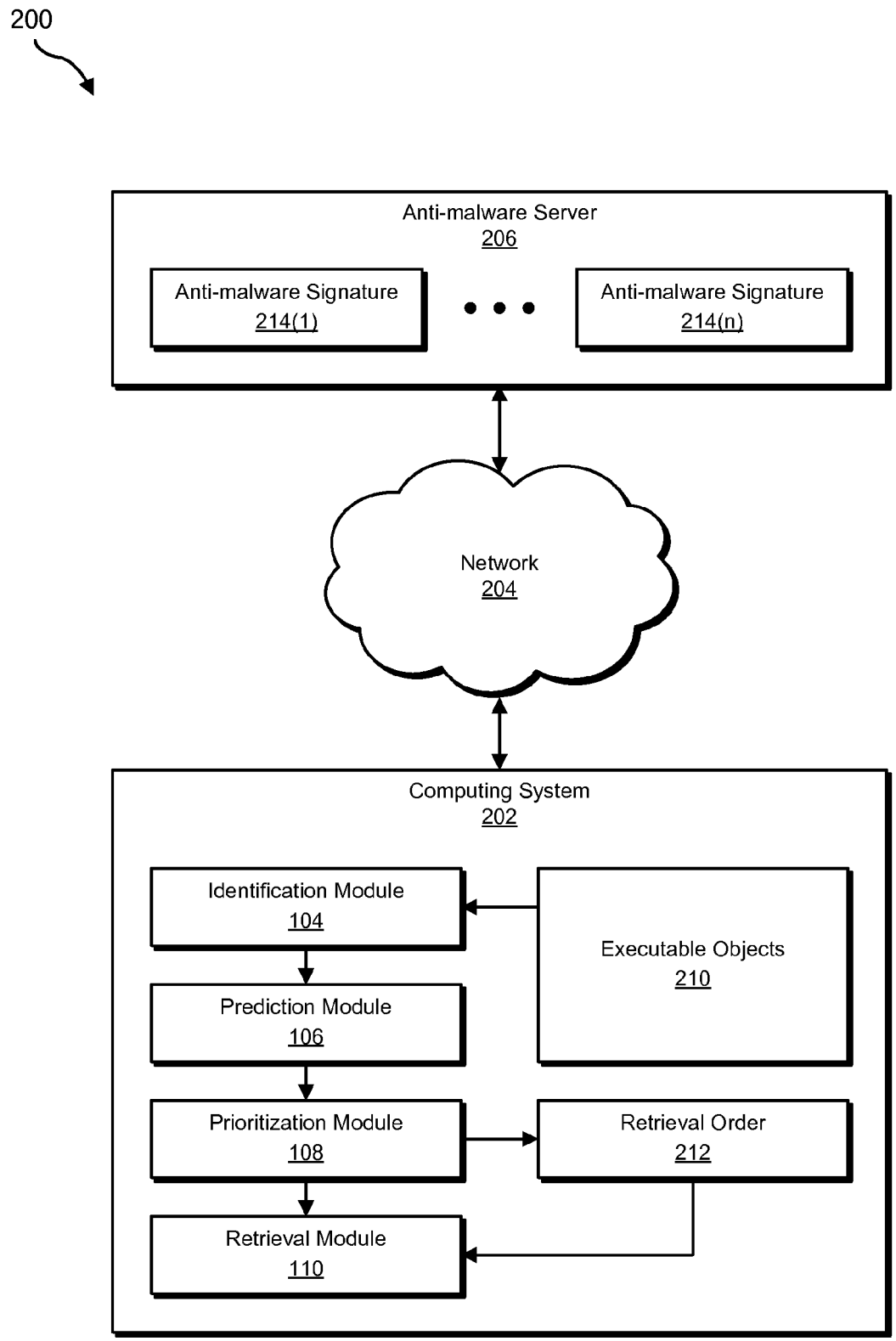
FIG. 2 is a block diagram of an exemplary system for looking up anti-malware metadata.
Figure 3:
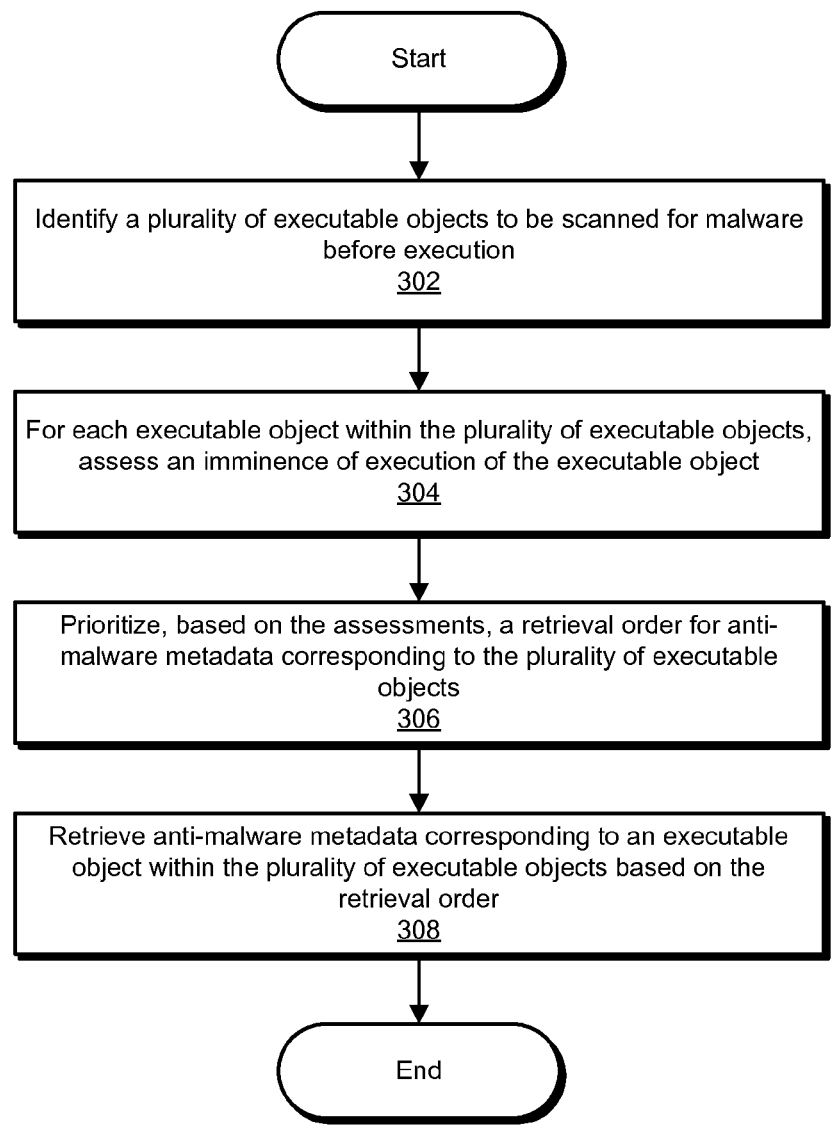
FIG. 3 is a flow diagram of an exemplary method for looking up anti-malware metadata.
Figure 4:
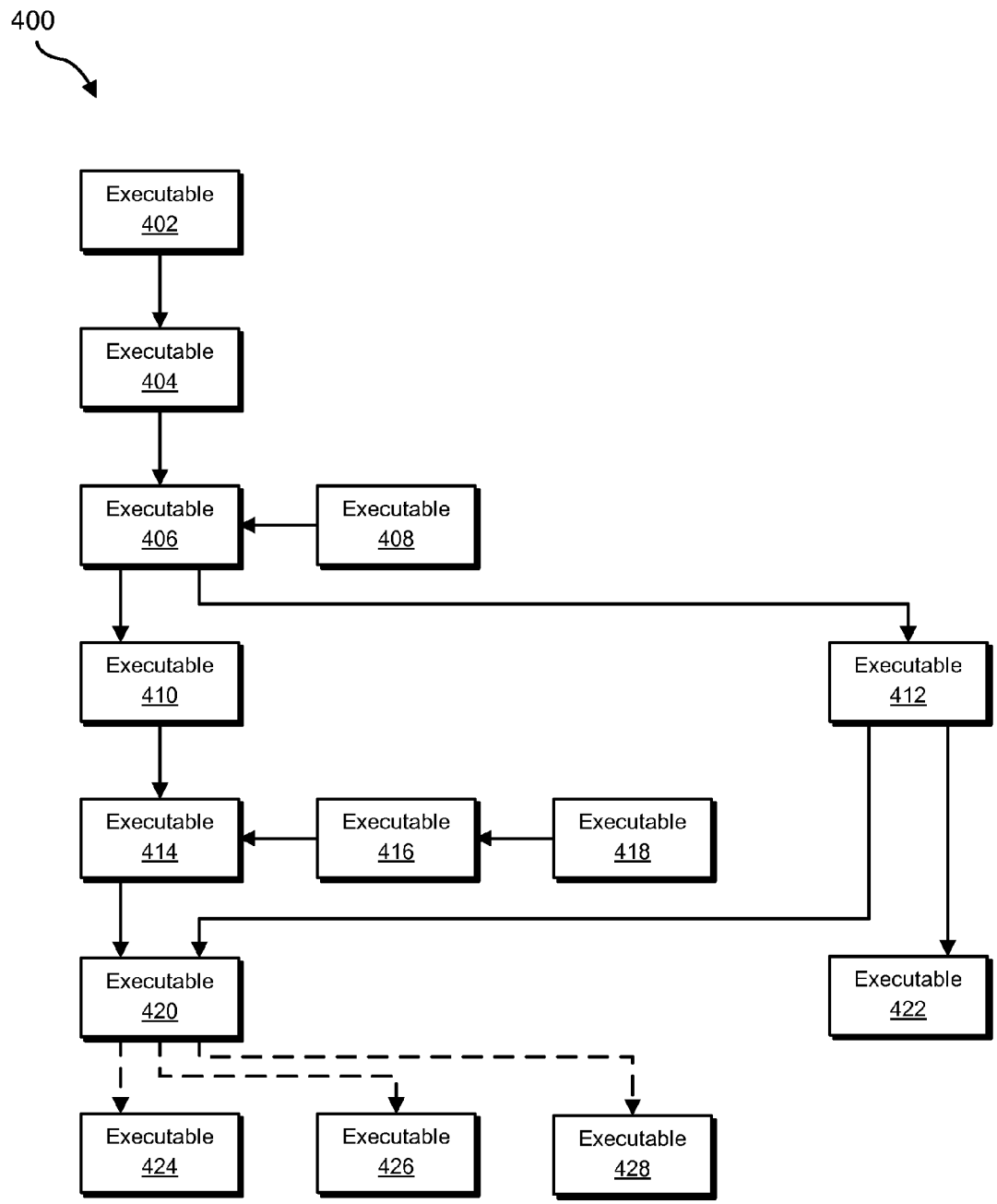
FIG. 4 is a block diagram of an exemplary dependency chart for executable files.

The following will provide, with reference to FIGS. 1, 2, and 4, detailed descriptions of exemplary systems for looking up anti-malware metadata. Detailed descriptions of corresponding computer-implemented methods will also be provided in connection with FIG. 3. Detailed descriptions of an exemplary dependency chart for executable files will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for looking up anti-malware metadata. As illustrated in this figure, exemplary system 100 may include one or more modules 102 for performing one or more tasks. For example, and as will be explained in greater detail below, exemplary system 100 may include an identification module 104 programmed to identify a plurality of executable objects to be scanned for malware before execution. Exemplary system 100 may also include a prediction module 106 programmed to, for each executable object within the plurality of executable objects, assess an imminence of execution of the executable object. Exemplary system 100 may additionally include a prioritization module 108 programmed to prioritize, based on the assessments, a retrieval order for anti-malware metadata corresponding to the plurality of executable objects.

In addition, and as will be described in greater detail below, exemplary system 100 may include a retrieval module 110 programmed to retrieve anti-malware metadata corresponding to an executable object within the plurality of executable objects based on the retrieval order. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or anti-malware server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 in communication with an anti-malware server 206 via a network 204. In one embodiment, and as will be described in greater detail below, computing system 202 may include identification module 104, prediction module 106, prioritization module 108, and retrieval module 110.

Identification module 104 may be programmed to identify executable objects 210 to be scanned for malware before execution. Prediction module 106 may be programmed to assess the imminence of execution for each of executable objects 210. Prioritization module 108 may be programmed to prioritize, based on the assessments, a retrieval order 212 for anti-malware metadata corresponding to executable objects 210. Retrieval module 110 may be programmed to retrieve anti-malware metadata (e.g., one or more of anti-malware signatures 214(1-$n$) stored on anti-malware server 206) corresponding to an executable object within the plurality of executable objects based on the retrieval order.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Anti-malware server 206 generally represents any type or form of computing device that is capable of providing anti-malware metadata in response to lookup attempts. Examples of anti-malware server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing system 202 and anti-malware server 206.

FIG. 3 is a flow diagram of an exemplary computer-implemented method 300 for looking up anti-malware metadata. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a plurality of executable objects to be scanned for malware before execution. For example, at step 302 identification module 104 may, as part of computing system 202 in FIG. 2, identify executable objects 210.

As used herein, the phrase "executable object" may refer to any collection of executable instructions. Examples of executable files include portable executable files, native executable files, library files (such as dynamic linked libraries and dynamic shared objects), bytecode files executed within an interpreter, and/or script files.

Identification module 104 may identify the plurality of executable objects in any suitable context. For example, the plurality of executable objects may reside on a system configured to scan and/or verify each executable object on the system before allowing the executable object to execute and/or be loaded for execution. In some examples, the system may be configured to scan each executable object for malware. Additionally or alternatively, the system may be configured to confirm the validity of and/or the absence of malware from each executable object. For example, the system may be configured to check each executable object against a whitelist, against known malware variants, and/or for community reputation scores.

Identification module 104 may identify the plurality of executable files from any of a variety of sources. In some examples, identification module 104 may use system configuration information to identify a set of automatically launched executable objects. The system configuration information may indicate when each automatically launched executable object in the set of automatically launched executable objects is likely to launch. The system configuration information may indicate when each automatically launched executable object is likely to launch in terms of absolute time, time relative to a current time, time relative to one or more events, in an order relative to one or more events (including relative to the execution of one or more executable objects), etc.

In some examples, identifying the set of automatically launched executable objects may include identifying at least one executable object configured to launch during an operating system boot process. For example, identification module 104 may harvest data from MICROSOFT WINDOWS PREFETCH and/or MICROSOFT WINDOWS SUPERFETCH to identify one or more executable objects configured to launch during the boot process and/or to identify other commonly used applications. Additionally or alternatively, identification module 104 may harvest data from BootExecute registry information. For example, identification module 104 may harvest data from any or all of:

HKEY_LOCAL_MACHINE\System\CurrentControlSet\Control\Session Manager\BootExecute
HKEY_LOCAL_MACHINE\System\CurrentControlSet\Control\Session Manager\SetupExecute
HKEY_LOCAL_MACHINE\System\CurrentControlSet\Control\Session Manager\Execute Identification module 104 also may identify a service as part of identifying the set of automatically launched executable objects. For example, identification module 104 may identify a registered service configured to automatically start. Additionally or alternatively, identification module 104 may identify a driver. For example, identification module 104 may harvest data from:

HKEY_LOCAL_MACHINE\System\CurrentControlSet\Services

In some examples, identification module 104 may identify a winsock provider and/or a layered service provider. Additionally or alternatively, identification module 104 may identify an executable object configured to execute upon login. For example, identification module 104 may harvest data from login configuration settings. As an example, identification module 104 may harvest data from any or all of:

C:\Users\[user]\AppData\Local\Microsoft\Windows Sidebar\Settings.ini
HKEY_LOCAL_MACHINE\SOFTWARE\Microsoft\Windows\CurrentVersion \Run
HKEY_LOCAL_MACHINE\SOFTWARE\Microsoft\Windows NT\CurrentVersion\Winlogon\Userinit
HKEY_LOCAL_MACHINE\SOFTWARE\Microsoft\Windows\CurrentVersion \RunOnceEx
HKEY_LOCAL_MACHINE\SOFTWARE\Microsoft\Windows\CurrentVersion \RunOnce
C:\ProgramData\Microsoft\Windows\Start Menu\Programs\Startup
C:\Users\[user] \AppData\Roaming\Microsoft\Windows\Start Menu\Programs\Startup
HKEY_CURRENT_USER\Software\Microsoft\Windows NT\CurrentVersion\Windows\Load
HKEY_CURRENT_USER\Software\Microsoft\Windows\CurrentVersion\Policies\Explorer\Run
HKEY_CURRENT_USER\Software\Microsoft\Windows\CurrentVersion\Run
HKEY_LOCAL_MACHINE\System\CurrentControlSet\Control\Terminal Server\Wds\rdpwd\StartupPrograms
HKEY_LOCAL_MACHINE\SOFTWARE\Microsoft\Windows NT\CurrentVersion\Winlogon\AppSetup
HKEY_CURRENT_USER\Software\Policies\Microsoft\Windows\System\Scripts\Logon
HKEY_LOCAL_MACHINE\Software\Policies\Microsoft\Windows\System\Scripts\Logon
HKEY_CURRENT_USER\Software\Microsoft\Windows\CurrentVersion\Policies\System\Shell
HKEY_CURRENT_USER\SOFTWARE\Microsoft\Windows NT\CurrentVersion\Winlogon\Shell
HKEY_LOCAL_MACHINE\SOFTWARE\Microsoft\Windows NT\CurrentVersion\Winlogon\GinaDLL
HKEY_LOCAL_MACHINE\SOFTWARE\Microsoft\Windows NT\CurrentVersion\Winlogon\Taskman
HKEY_LOCAL_MACHINE\SOFTWARE\Microsoft\Windows NT\CurrentVersion\Winlogon\Notify Identification module 104 also may identify an executable object configured to execute according to a task scheduler. In this example, identification module 104 may harvest data from a configuration file of the task scheduler to identify the executable object.

In some examples, identification module 104 may identify an executable object configured to automatically load and/or execute in the place of and/or at the same time as another executable object. For example, identification module 104 may identify an image hijack configuration that causes an executable file to execute in the place of another executable file (e.g., a debugger configured to load an executable file instead of directly executing the executable file). Additionally or alternatively, identification module 104 may identify a component injection configuration that causes a library to automatically load with one or more applications. As an example, identification module 104 may harvest data from either or both of:

HKEY_LOCAL_MACHINE\SOFTWARE\Microsoft\Windows NT\CurrentVersion\Windows\Appinit_Dlls
HKEY_LOCAL_MACHINE\Software\Microsoft\Windows NT\CurrentVersion\Image File Execution Options As part of identifying the plurality of executable objects, identification module 104 also may identify a set of executable objects likely to be launched by a user. For example, identification module 104 may identify an executable object on a desktop belonging to the user. Additionally or alternatively, identification module 104 may identify an executable object in a download folder belonging to the user (e.g., a folder configured as a default target location for files downloaded from remote sources). In some examples, identification module 104 may identify a list of executable objects within an application launch menu (e.g., a list of recently launched applications). Additionally or alternatively, identification module 104 may examine the state of one or more user interface elements to identify the executable object. For example, identification module 104 may identify a link to an executable object currently highlighted and/or put into mouse and/or keyboard focus by a user. Additionally or alternatively, identification module 104 may identify the executable object within an opened window displaying the contents of the directory of the executable object.

In some examples, identification module 104 may extend the plurality of executable objects by identifying one or more executable objects upon which an identified executable object depends for execution. For example, identification module 104 may identify a first executable object within the plurality of executable objects, identify dependency information that indicates that the first executable object depends upon a second executable object, and then include the second executable object in the plurality of executable objects. For example, identification module 104 may examine an import table within the first executable object and identify the second executable object as referenced within the import table. FIG. 4 is a block diagram of an exemplary dependency chart 400 for executable files. As illustrated in FIG. 4, an executable 402 may require execution before an executable 404 and executable 404 may require execution before an executable 406 (e.g., as part of a boot process). Executable 406 may depend on an executable 408 (e.g., a library referenced in an import table of executable 406). Accordingly, identification module 104 may identify executables 402, 404, and 406 as part of the boot process. Identification module 104 may then identify executable 408 because executable 406 depends on executable 408. In some examples, identification module 104 may also collect and/or map dependency information between the plurality of executable objects (e.g., as illustrated in FIG. 4). For example, identification module 104 may provide the dependency information to prediction module 106.

In some examples, identification module 104 may extend the plurality of executable objects by identifying one or more executable objects which operate as extensions to an identified executable object. For example, identification module 104 may identify a first executable object within the plurality of executable objects and identify a second executable object that operates as an extension to the first executable object. For example, the first executable object may include a browser and the second executable object may include an extension to the browser. Additionally or alternatively, the first executable object may include MICROSOFT WINDOWS EXPLORER and the second executable object may include a shell extension. As an example, identification module 104 may harvest data from any or all of:

HKEY_LOCAL_MACHINE\SOFTWARE\Classes\
  Protocols\Filter
HKEY_LOCAL_MACHINE\Software\Microsoft\
  Windows\CurrentVersion\Explorer\ShellExecuteHooks
HKEY_CURRENT_USER\Software\Classes\*\ShellEx\
  ContextMenuHandlers
HKEY_LOCAL_MACHINE\Software\Classes\*\
  ShellEx\PropertySheetHandlers
HKEY_LOCAL_MACHINE\Software\Classes\
  Directory\Shellex\CopyHookHandlers
HKEY_CURRENT_USER\Software\Classes\Folder\
  ShellEx\DragDropHandlers
HKEY_LOCAL_MACHINE\Software\Wow6432Node\
  Microsoft\Windows\CurrentVersion\Explorer\
  ShellIconOverlayIdentifiers Identification module 104 also may identify one or more executable objects upon and/or after execution. For example, identification module 104 may identify an executable object launched for execution and/or an executable object in execution. In some examples, identification module 104 may monitor execution patterns of applications to identify executable objects that are frequently executed and/or executable objects that are likely to be executed in certain orders and/or according to certain patterns.

Figure 5:
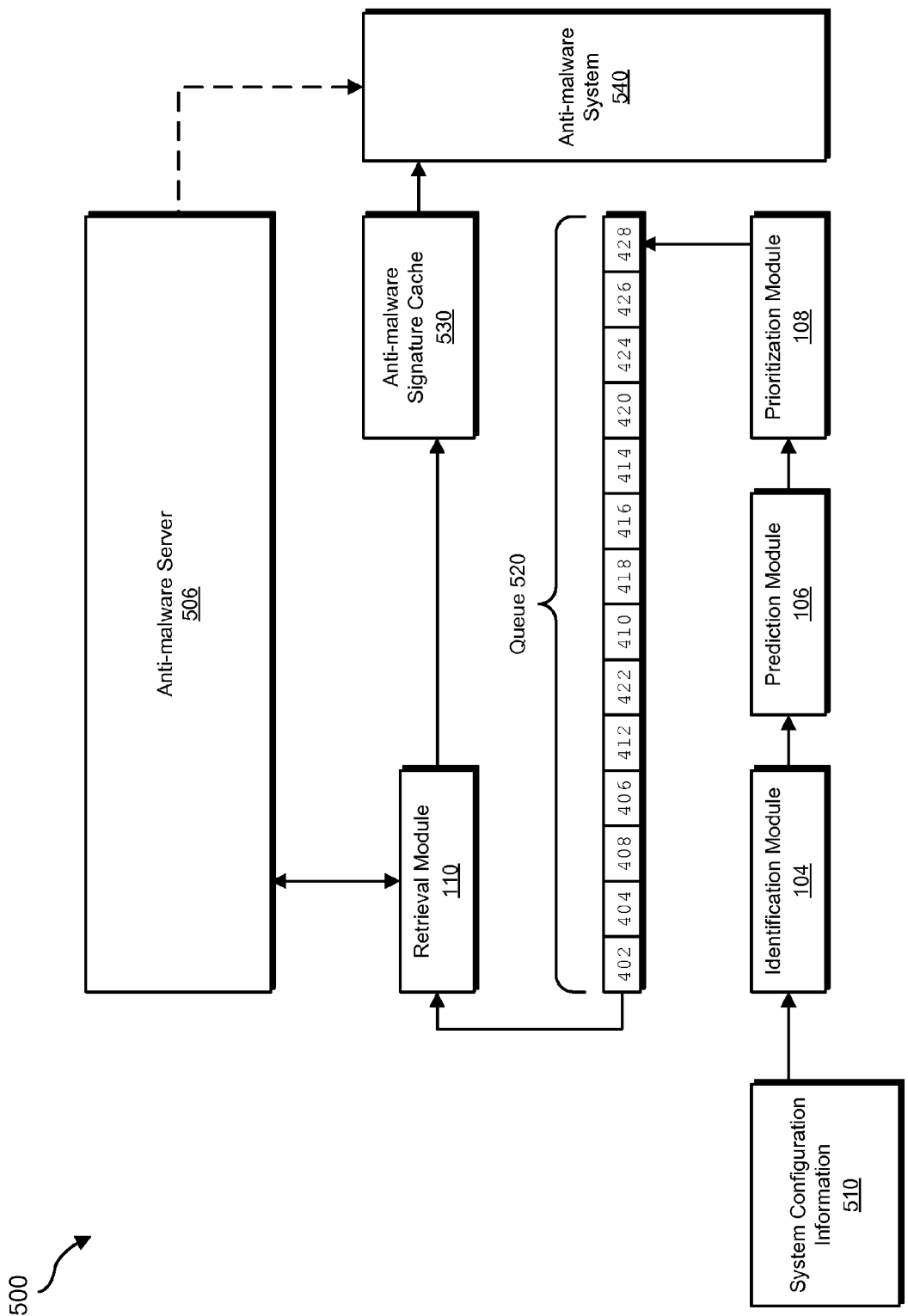
FIG. 5 is a block diagram of an exemplary system for looking up anti-malware metadata.

FIG. 5 illustrates an exemplary system 500 for looking up anti-malware metadata. Using FIG. 5 as an example, identification module 104 may identify the executables of FIG. 4 (e.g., using system configuration information 510).

Returning to FIG. 3, at step 304 one or more of the systems described herein may, for each executable object within the plurality of executable objects, assess an imminence of execution of the executable object. For example, at step 304 prediction module 106 may, as part of computing system 202 in FIG. 2, assess the imminence of execution of each of executable objects 210. Using FIG. 5 as an additional example, at step 304 prediction module 106 may assess the imminence of execution of each executable object within the plurality of executable objects.

Prediction module 106 may assess the imminence of execution of an executable object in a variety of ways. For example, prediction module 106 may assess the probability that the executable object will execute within a predetermined amount of time. For example, prediction module 106 may assess the probability that the executable object will execute within the time it would take to retrieve anti-malware metadata for the executable object and/or scan the executable object with the anti-malware metadata. Additionally or alternatively, prediction module 106 may assess whether the executable object is most likely to be the next executable object to execute. In some examples, prediction module 106 may assess the imminence of execution of the executable object in combination with the importance of the executable object—e.g., how important timely execution of the executable object is to a user's experience (e.g., prioritizing executable objects providing core functionality and/or user interface elements over non-interactive background tasks), how many executable objects depend on the executable object, etc.

Prediction module 106 may assess the imminence of execution of the executable object using a variety of information. For example, prediction module 106 may use information gathered by identification module 104, including the context in which the executable object was identified. For example, prediction module 106 may determine that the execution of the executable object is imminent if a boot process is underway and/or boot dependency information indicates that the executable object will soon be execute. Additionally or alternatively, prediction module 106 may determine that the execution of the executable object is imminent if an operating system is about to load services and/or drivers and the executable object includes a registered service and/or driver configured to automatically load. In some examples, prediction module 106 may determine that the execution of the executable object is more likely imminent if a current desktop displays a link to the executable object. Prediction module 106 also may determine that the execution of the executable object is imminent if prediction module 106 has determined that the execution of another executable object which depends on the executable object is imminent.

In some examples, prediction module 106 may identify a creation time of the executable object. Prediction module 106 may then increase an expectation of imminent execution of the executable object monotonically with a distance between the creation time and the present time. For example, prediction module 106 may reduce an imminence rating for an old executable object and/or increase an imminence rating for a new executable object.

Prediction module 106 may assess the imminence of execution of the executable object with a variety of metrics, data structures, and/or algorithms. For example, prediction module 106 may generate an imminence rating and/or score for the executable object. Additionally or alternatively, prediction module 106 may create a dependency chart including the executable object. Generally, prediction module 106 may use any algorithm which may at least partially order the plurality of executable objects. In some examples, prediction module 106 may use hard-coded and/or explicitly configured weights and/or inputs for an algorithm generating the imminence rating. For example, prediction module 106 may be configured to give a large weight to boot process dependency information during a boot process. As another example, prediction module 106 may be configured to give a smaller weight to the presence of an executable object on a desktop than to a configuration of a task scheduler indicating a scheduled execution time of the executable object. Additionally or alternatively, prediction module 106 may be configured to automatically adjust weights and/or inputs for the algorithm based on past experience. For example, if prediction module 106 fails to predict the execution of the executable object despite an input recognized by the algorithm that indicated that execution was imminent, prediction module 106 may increase the weight of the input.

Using FIG. 4 as an example, prediction module 106 may create dependency chart 400 to indicate a likely order of execution of executable objects during a boot process. For example, both executables 410 and 412 may execute only after executable 406. Executable 414 may only execute after executable 410 and may furthermore depend on executables 416 and 418. Executable 420 may execute only after executables 414 and 412. Likewise, executable 422 may execute only after executable 412. Executables 424, 426, and 428 may represent plug-ins to executable 420.

Returning to FIG. 3, at step 306 one or more of the systems described herein may prioritize, based on the assessments, a retrieval order for anti-malware metadata corresponding to the plurality of executable objects. For example, at step 306 prioritization module 108 may, as part of computing system 202 in FIG. 2, create retrieval order 212 for one or more of anti-malware signatures 214(1)-(n) corresponding to executable objects 210. Using FIG. 5 as an additional example, at step 306 prioritization module 108 may prioritize a retrieval order for anti-malware metadata from anti-malware server 506 corresponding to the executables of FIG. 4 within a queue 520.

As used herein, the phrase "anti-malware metadata" may refer to any data used to determine whether an executable object includes and/or poses a malware threat. Accordingly, anti-malware metadata that "corresponds" to an executable object may refer to anti-malware metadata used to determine whether the executable object includes and/or poses a malware threat. Generally, "anti-malware metadata" may refer to any data that an anti-malware system may use in the course of scanning, verifying, and/or checking a file. For example, anti-malware metadata may include an anti-malware signature. As used herein, the phrase "anti-malware signature" may refer to any fingerprint, hash, and/or any other representation or identifying characteristic of a malware variant, family, and/or strain. Another example of anti-malware metadata may include a whitelist signature. A whitelist signature may include any fingerprint, hash, and/or any other representation or identifying characteristic of a known good file. An additional example of anti-malware metadata may include reputation information for a file.

The term "reputation information," as used herein, generally refers to information that conveys the opinion of a specific community (such as the user base of a security-software publisher) on the trustworthiness or legitimacy of an executable file, software publisher, and/or file source (such as a web domain or download link). Examples of reputation information include, without limitation, reputation scores (where, for example, high reputation scores indicate that a file, software publisher, or file source is generally trusted within a community and low reputation scores indicate that a file, software publisher, or file source is generally untrusted within a community), prevalence information (e.g., information that identifies the number or percentage of user devices within a community that contain (1) an instance of a particular file, (2) files provided by a particular software publisher, and/or (3) files obtained from a particular file source, such as a web domain), or any other information that may be used to identify a community's opinion on the trustworthiness or legitimacy of a file, software publisher, and/or file source.

Prioritization module 108 may prioritize the retrieval order in any suitable manner. For example, prioritization module 108 may use any scores, ratings, and/or dependency charts generated by prediction module 106 to determine the retrieval order. In some examples, prioritization module 108 may prioritize the retrieval order so as to minimize the predicted latency caused by delaying execution of one or more executable files while retrieving anti-malware metadata.

In some examples, prioritization module 108 may continually revise the retrieval order. For example, if an anti-malware metadata lookup for MICROSOFT WINWORD expires and a user accesses MICROSOFT WINWORD more frequently than MINESWEEPER, prioritization module 108 may prioritize the lookup for MICROSOFT WINWORD over MINESWEEPER.

Using FIG. 5 as an example, prioritization module 108 may create and/or modify queue 520 based on dependency chart 400 generated by prediction module 106. For example, prioritization module 108 may place executable 402 at the front of queue 520 because executable 402 is at the root of dependency chart 400. Likewise, prioritization module 108 may place executable 404 next within queue 520 because executable 404 follows executable 402 in dependency chart 400. Prioritization module 108 may place executables 408 and 406 next within dependency chart 400 because executable 406 follows executable 404 but depends on executable 408. In some examples, executables 420 and 422 may represent interactive executable objects (e.g., executable objects presenting a user interface). Accordingly, prioritization module 108 may place executables 412 and 422 before executable 410 within queue 520 in order to follow the shortest path to loading an interactive executable object. Prioritization module 108 may then place executables 418, 416, 414, 420, 424, 426, and 428 in queue 520 to complete the other path in dependency chart 400.

In some examples, prioritization module 108 also may receive, from a remote computing system, prioritization information for retrieving anti-malware metadata relating to at least one executable object within the plurality of executable objects. For example, instances of modules 102 may run on other client systems, gathering data on executable dependencies, executable launch patterns, and user executable preferences. These other client systems may contribute the gathered data to a central server which may, in turn, aggregate the data and distribute the data for the use of the various instances of prioritization module 108 running on the various client systems.

Returning to FIG. 3, at step 308 one or more of the systems described herein may retrieve anti-malware metadata corresponding to an executable object within the plurality of executable objects based on the retrieval order. For example, at step 308 retrieval module 110 may, as part of computing system 202 in FIG. 2, retrieve at least one of anti-malware signatures 214(1)-(n) corresponding to executable objects 210 based on retrieval order 212. Using FIG. 5 as an additional example, at step 308 retrieval module 110 may retrieve anti-malware metadata from anti-malware server 506 based on queue 520.

In some examples, retrieval module 110 may retrieve the anti-malware metadata in time to scan the executable object before an attempted launch of the executable object. Using FIG. 5 as an example, after retrieving the anti-malware metadata, retrieval module 110 may store the anti-malware metadata in an anti-malware signature cache 530. An anti-malware system 540 may then detect an attempt to launch an executable file. Anti-malware system 540 may simply scan the executable file using the anti-malware metadata from anti-malware signature cache 530 rather than retrieving the required anti-malware metadata from anti-malware server 506. In some examples, retrieval module 110 may retrieve the anti-malware metadata (e.g., an anti-malware signature) from a remote storage system. For example, anti-malware server 506 may include a cloud storage service that stores the anti-malware metadata corresponding to the plurality of executable objects. Accordingly, retrieving anti-malware metadata from anti-malware server 506 directly before the execution of an executable object may cause unwanted latency as opposed to retrieving anti-malware metadata from anti-malware signature cache 530. After step 308, method 300 may terminate.

In some examples, the systems described herein may also perform an anti-malware scan on the executable object using the anti-malware metadata. The systems described herein may then launch the executable object if the anti-malware scan indicates that the executable object is safe or block execution of the executable object if the scan indicates that the executable object is unsafe.

By prioritizing the lookup of anti-malware metadata, the systems and methods described herein may allow anti-malware systems to retrieve anti-malware metadata and scan executable files before launch with decreased perceived latency by users who launch the executable files.

Figure 6:
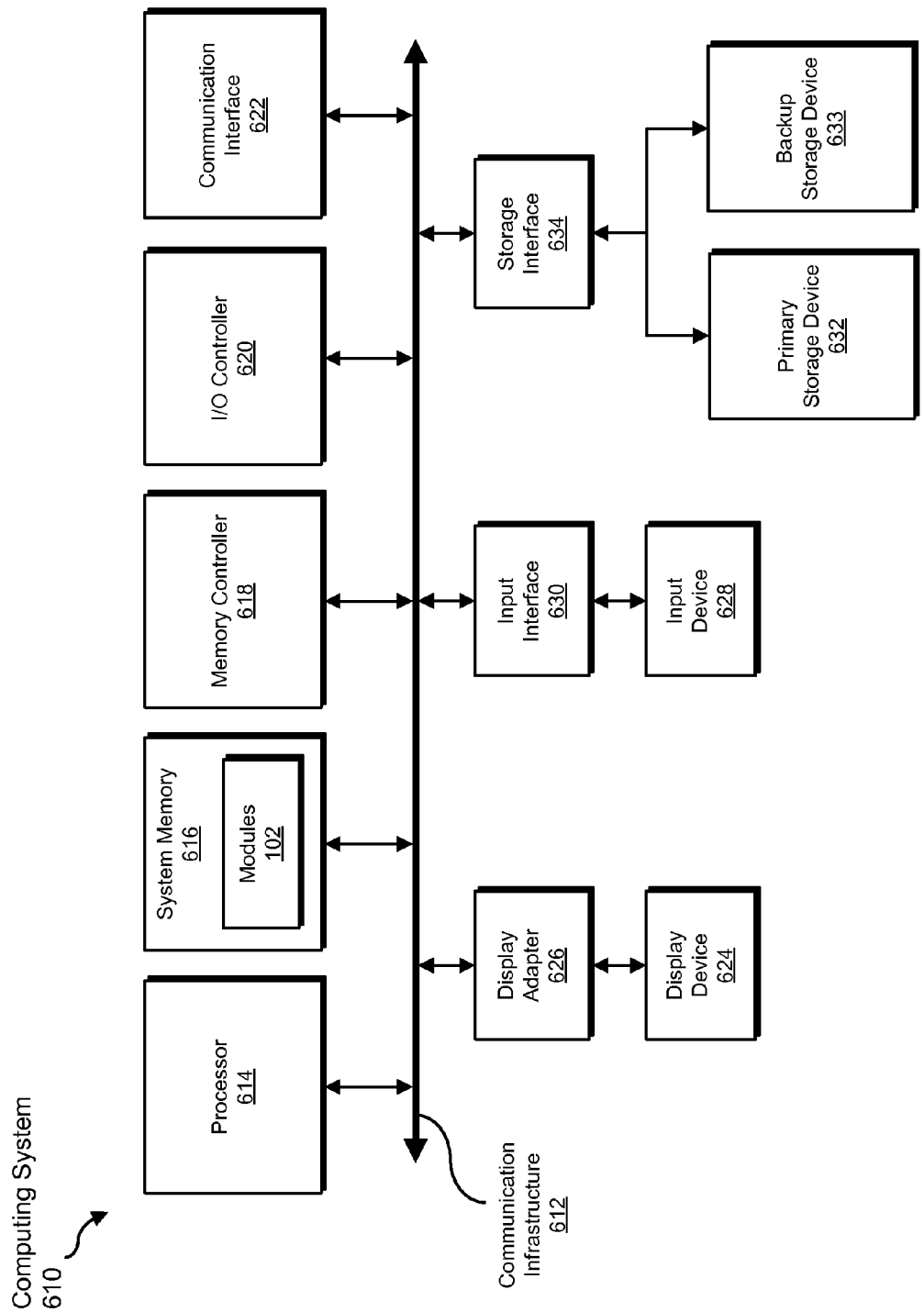
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, using, assessing, increasing, prioritizing, receiving, and/or retrieving steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, using, assessing, increasing, prioritizing, receiving, and/or retrieving.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, using, assessing, increasing, prioritizing, receiving, and/or retrieving steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, using, assessing, increasing, prioritizing, receiving, and/or retrieving steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, using, assessing, increasing, prioritizing, receiving, and/or retrieving steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, using, assessing, increasing, prioritizing, receiving, and/or retrieving steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
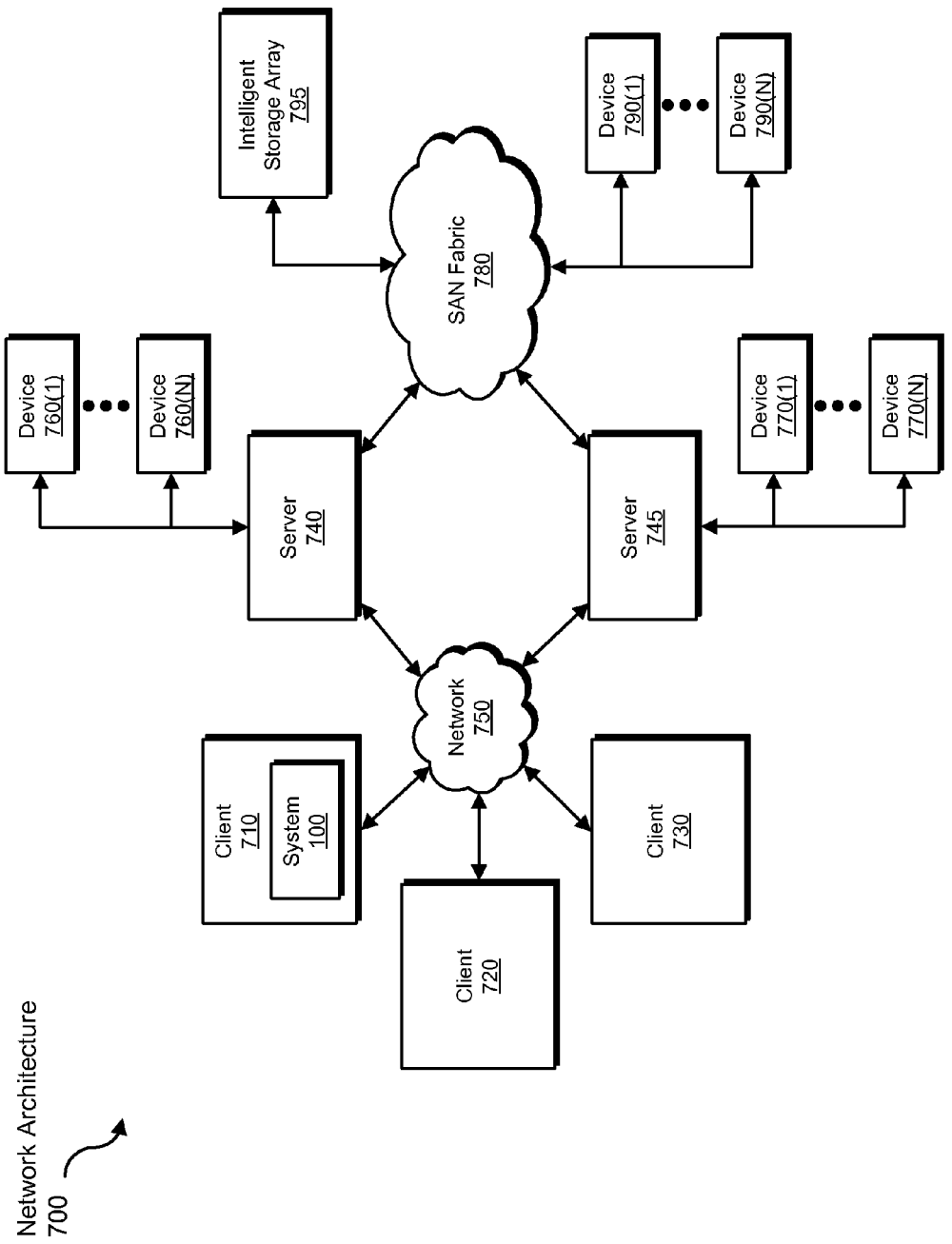
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, using, assessing, increasing, prioritizing, receiving, and/or retrieving steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for looking up anti-malware metadata.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform an anti-malware system into a low-latency anti-malware system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for looking up server-side anti-malware metadata, the method comprising:
   identifying a plurality of client-side executable objects on a first computing system, wherein the plurality of client-side executable objects are to be scanned for malware before execution such that waiting for server-side anti-malware signatures to be used in scanning the malware may result in access latency to the plurality of client-side executable objects;
   predicting when the server-side anti-malware metadata will be needed by, for each client-side executable object within the plurality of client-side executable objects, assessing an imminence of execution of the client-side executable object;
   identifying, on a second computing system that is remote from the first computing system, the server-side anti-malware metadata corresponding to each client-side executable object within the plurality of client-side executable objects;
   prioritizing, based on the assessments, a retrieval order for the server-side anti-malware metadata corresponding to the plurality of client-side executable objects; and
   retrieving, based on the retrieval order, the server-side anti-malware metadata from the second computing system prior to any attempt to launch the corresponding client-side executable object within the plurality of client-side executable objects;
   storing the retrieved anti-malware metadata in a client-side anti-malware signature cache for availability upon an attempt to launch the corresponding client-side executable object such that access latency due to retrieval of the server-side anti-malware metadata is decreased;
   wherein at least a portion of the method is performed by a computing device comprising at least one hardware processor.

2. The computer-implemented method of claim 1, wherein identifying the plurality of client-side executable objects comprises using system configuration information to identify a set of automatically launched client-side executable objects, the system configuration information indicating when each automatically launched client-side executable object in the set of automatically launched client-side executable objects is likely to launch.

3. The computer-implemented method of claim 2, wherein identifying the set of automatically launched client-side executable objects comprises identifying at least one client-side executable object that launches during an operating system boot process.

4. The computer-implemented method of claim 1, wherein identifying the plurality of client-side executable objects comprises identifying a set of client-side executable objects likely to be launched by a user.

5. The computer-implemented method of claim 4, wherein identifying the set of client-side executable objects likely to be launched by the user comprises identifying at least one of:
   an executable object on a desktop belonging to the user; and
   an executable object in a download folder belonging to the user.

6. The computer-implemented method of claim 1, wherein identifying the plurality of client-side executable objects comprises:
   identifying a first client-side executable object within the plurality of client-side executable objects;
   identifying dependency information that indicates that the first client-side executable object depends upon a second client-side executable object; and
   including the second client-side executable object in the plurality of client-side executable objects.

7. The computer-implemented method of claim 1, wherein identifying the plurality of client-side executable objects comprises:
   identifying a first client-side executable object within the plurality of client-side executable objects; and
   identifying a second client-side executable object that operates as an extension to the first client-side executable object.

8. The computer-implemented method of claim 1, wherein identifying the plurality of client-side executable objects comprises identifying at least one of:
   an executable object launched for execution; and
   an executable object in execution.

9. The computer-implemented method of claim 1, wherein prioritizing the retrieval order comprises receiving, from a remote computing system, prioritization information for retrieving anti-malware metadata relating to at least one client-side executable object within the plurality of client-side executable objects.

10. The computer-implemented method of claim 1, wherein assessing the imminence of execution of the client-side executable object comprises:
    identifying a creation time of the client-side executable object; and
    increasing an expectation of imminent execution of the client-side executable object monotonically with a distance between the creation time and a present time.

11. The computer-implemented method of claim 1, wherein retrieving the server-side anti-malware metadata comprises retrieving an anti-malware signature from a remote storage system.

12. The computer implemented method of claim 1, further comprising:
    detecting the attempt to launch the client-side executable object corresponding to the retrieved anti-malware metadata stored in the client-side anti-malware signature cache;
    accessing, in response to detecting the attempt to launch, the retrieved anti-malware metadata stored in the client-side anti-malware signature cache;
    using the retrieved anti-malware metadata stored in the client-side anti-malware signature cache to scan directly before execution of the client-side executable object.

13. A system for looking up server-side anti-malware metadata, the system comprising:
    an identification module programmed to:
       identify a plurality of client-side executable objects on a first computing system, wherein the plurality of client-side executable objects are to be scanned for malware before execution such that waiting for server-side anti-malware signatures to be used in scanning the malware may result in access latency to the plurality of client-side executable objects,
       identify, on a second computing system that is remote from the first computing system, the server-side anti-malware metadata corresponding to each client-side executable object within the plurality of client-side executable objects;

a prediction module programmed to, for each client-side executable object within the plurality of client-side executable objects, predict when the server-side anti-malware metadata will be needed by assessing an imminence of execution of the client-side executable object;

a prioritization module programmed to prioritize, based on the assessments, a retrieval order for the server-side anti-malware metadata corresponding to the plurality of client-side executable objects;

a retrieval module programmed to retrieve, based on the retrieval order, at least one server-side anti-malware metadata from the second computing system prior to any attempt to launch a corresponding client-side executable object within the plurality of client-side executable objects;

a storage module programmed to store the retrieved anti-malware metadata in a client-side anti-malware signature cache for availability upon an attempt to launch the corresponding client-side executable object such that access latency due to retrieval of the server-side anti-malware metadata is decreased; and at least one hardware processor configured to execute the identification module, the prediction module, the prioritization module, and the retrieval module.

14. The system of claim 13, wherein the identification module is programmed to identify the plurality of client-side executable objects by using system configuration information to identify a set of automatically launched client-side executable objects, the system configuration information indicating when each automatically launched client-side executable object in the set of automatically launched client-side executable objects is likely to launch.

15. The system of claim 14, wherein the identification module is programmed to identify the set of automatically launched client-side executable objects by identifying at least one client-side executable object that launches during an operating system boot process.

16. The system of claim 13, wherein the identification module is programmed to identify the plurality of client-side executable objects by identifying a set of client-side executable objects likely to be launched by a user.

17. The system of claim 13, wherein the prediction module is programmed to assess the imminence of execution of the client-side executable object by assessing a probability that the client-side executable object will execute within a predetermined amount of time.

18. The system of claim 13, wherein the prediction module is programmed to assess imminence of execution of the client-side executable object by assessing whether the client-side executable object is most likely to be the next client-side executable object to execute.

19. The system of claim 13, further comprising:
a detection module programmed to detect the attempt to launch the client-side executable object corresponding to the retrieved anti-malware metadata stored in the client-side anti-malware signature cache;

an access module programmed to access, in response to detecting the attempt to launch, the retrieved anti-malware metadata stored in the client-side anti-malware signature cache;

a scanning module programmed to use the accessed anti-malware metadata to scan directly before execution of the client-side executable object.

20. A non-transitory computer-readable-storage medium comprising one or more computer-executable instructions that, when executed by at least one processor of a computing device, cause the computing device to:

identify a plurality of client-side executable objects on a first computing system, wherein the plurality of client-side executable objects are to be scanned for malware before execution such that waiting for server-side anti-malware signatures to be used in scanning the malware may result in access latency to the plurality of client-side executable objects;

for each client-side executable object within the plurality of client-side executable objects, predict when the server-side anti-malware metadata will be needed by assessing an imminence of execution of the client-side executable object;

identify, on a second computing system that is remote from the first computing system, the server-side anti-malware metadata corresponding to each client-side executable object within the plurality of client-side executable objects;

prioritize, based on the assessments, a retrieval order for the server-side anti-malware metadata corresponding to the plurality of client-side executable objects;

retrieve, based on the retrieval order, the server-side anti-malware metadata from the second computing system prior to any attempt to launch the corresponding client-side executable object within the plurality of client-side executable objects; and store the retrieved anti-malware metadata in a client-side anti-malware signature cache for availability upon an attempt to launch the corresponding client-side executable object such that access latency due to retrieval of the server-side anti-malware metadata is decreased.

* * * * *